United States Patent
Prom et al.

(10) Patent No.: US 9,662,717 B2
(45) Date of Patent: May 30, 2017

(54) DRILLING TOOL

(75) Inventors: Jeffrey Prom, Cedarburg, WI (US); Andrew Brill, Cedar Grove, WI (US)

(73) Assignee: Sharon-Cutwell Co., Inc., Belgium, WI (US)

( * ) Notice: Subject to any disclaimer, the term of this patent is extended or adjusted under 35 U.S.C. 154(b) by 554 days.

(21) Appl. No.: 13/477,744

(22) Filed: May 22, 2012

(65) Prior Publication Data

US 2012/0301239 A1    Nov. 29, 2012

Related U.S. Application Data

(60) Provisional application No. 61/489,069, filed on May 23, 2011.

(51) Int. Cl.
*B23B 51/02* (2006.01)

(52) U.S. Cl.
CPC ........ *B23B 51/02* (2013.01); *B23B 2226/275* (2013.01); *B23B 2226/31* (2013.01); *B23B 2228/08* (2013.01); *B23B 2228/10* (2013.01); *B23B 2251/087* (2013.01); *B23B 2251/14* (2013.01); *Y10T 408/78* (2015.01); *Y10T 408/81* (2015.01); *Y10T 408/905* (2015.01); *Y10T 408/906* (2015.01); *Y10T 408/907* (2015.01); *Y10T 408/909* (2015.01); *Y10T 408/9097* (2015.01)

(58) Field of Classification Search
CPC ..... B23B 51/02; Y10T 408/78; Y10T 408/81; Y10T 408/9097; Y10T 408/909; Y10T 408/905; Y10T 408/906

USPC ................ 408/144, 145, 230, 227, 223, 224
See application file for complete search history.

(56) References Cited

U.S. PATENT DOCUMENTS

| | | | | |
|---|---|---|---|---|
| 571,253 | A | * 11/1896 | Wesselmann et al. | ....... 408/223 |
| 4,529,341 | A | 7/1985 | Greene | |
| 4,802,799 | A | * 2/1989 | Rachev | ......... 408/144 |
| 5,011,342 | A | * 4/1991 | Hsu | ............... 408/224 |
| 5,154,550 | A | * 10/1992 | Isobe et al. | .................. 408/144 |
| 5,160,232 | A | 11/1992 | Maier | |
| 5,273,380 | A | * 12/1993 | Musacchia | .................... 408/230 |
| 5,442,979 | A | * 8/1995 | Hsu | .............................. 76/108.6 |
| 5,452,971 | A | * 9/1995 | Nevills | ......... 408/230 |
| 5,716,170 | A | * 2/1998 | Kammermeier et al. | .... 408/145 |
| 6,676,342 | B2 | 1/2004 | Mast et al. | |

(Continued)

FOREIGN PATENT DOCUMENTS

DE         84413 C      12/1895
DE       3730377 A1 *   3/1989
(Continued)

OTHER PUBLICATIONS

Machine translation, German patent document, DE3730377A1, "Cutting tool", Maier, A., Mar. 30, 1989.*

(Continued)

*Primary Examiner* — Daniel Howell
*Assistant Examiner* — Chwen-Wei Su
(74) *Attorney, Agent, or Firm* — Boyle Fredrickson, SC

(57) ABSTRACT

A drill bit or boring tool having cutting edge that includes a pair of generally smooth curvilinear shaped portions that are positioned near the radial outer portions of the cutting edge and connected to one another by a pair of generally linear portions that traverse the longitudinal centerline of the tool.

12 Claims, 2 Drawing Sheets

(56) References Cited

U.S. PATENT DOCUMENTS

| | | | |
|---|---|---|---|
| 6,848,969 B2* | 2/2005 | Luderich | 451/5 |
| D635,429 S | 4/2011 | Hakki | |
| 8,864,425 B2* | 10/2014 | Osawa et al. | 408/233 |
| 2006/0112648 A1 | 6/2006 | Hanyu | |
| 2008/0166196 A1* | 7/2008 | Zhu | 408/230 |
| 2010/0158627 A1 | 6/2010 | Mir | |
| 2011/0116884 A1* | 5/2011 | Li | 408/223 |
| 2011/0200403 A1 | 8/2011 | Gruber | |
| 2013/0017029 A1* | 1/2013 | Sun | 408/227 |

FOREIGN PATENT DOCUMENTS

| | | | | |
|---|---|---|---|---|
| EP | 1127645 | B1 | 1/2008 | |
| EP | 2527066 | A2 | 11/2012 | |
| GB | 2201910 | A * | 9/1988 | B23B 51/02 |

OTHER PUBLICATIONS

English translation of German patent document, DE3730377A1, "Chip-removing cutting tool", Maier, A., by USPTO, Oct. 2016.*
Guhring Wave Point Photograph—(1 page).
Extended European search report dated Feb. 25, 2015; European Patent Application No. 12 00 4017—(7) pages.

* cited by examiner

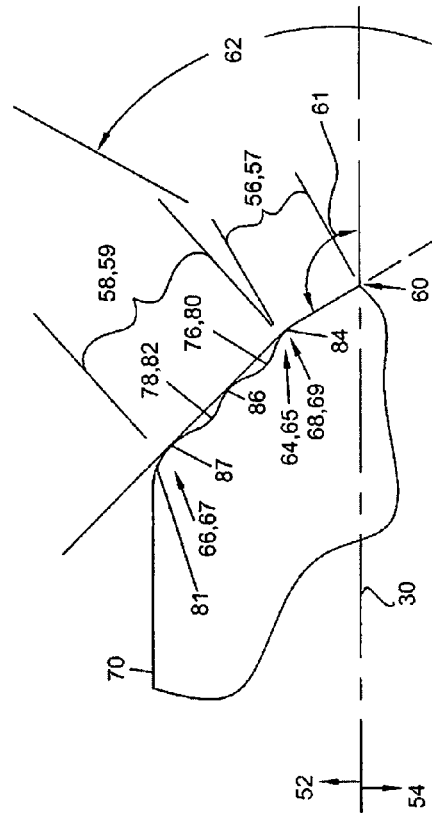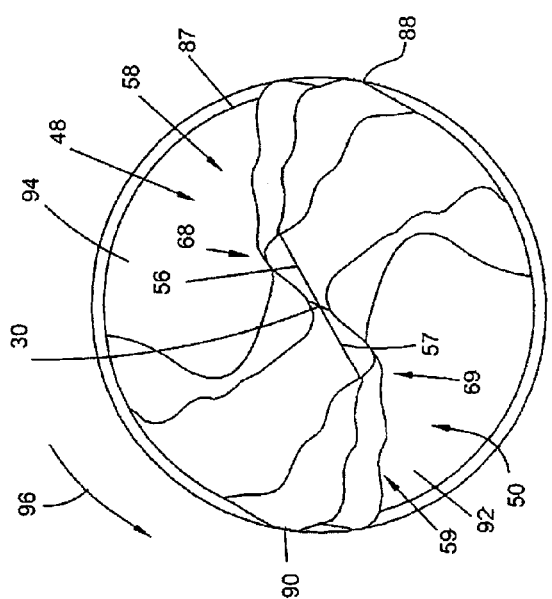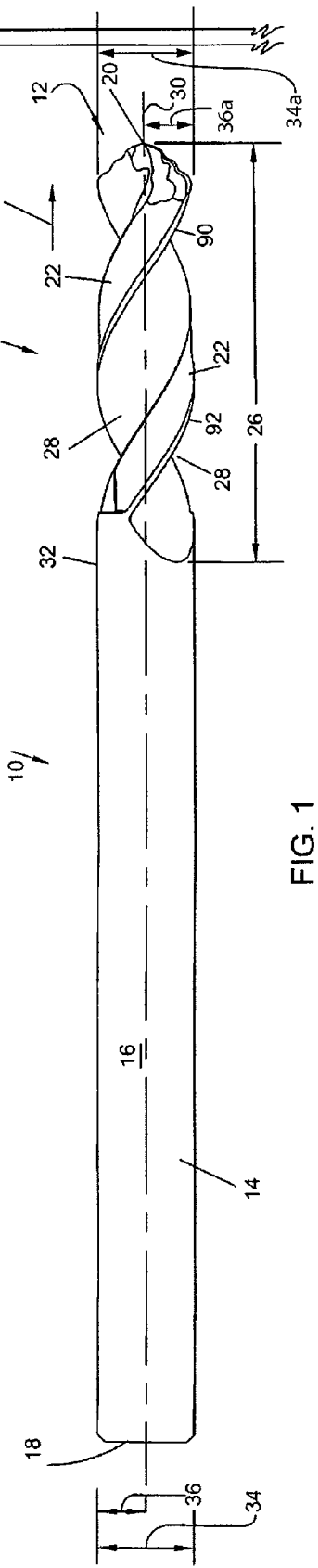

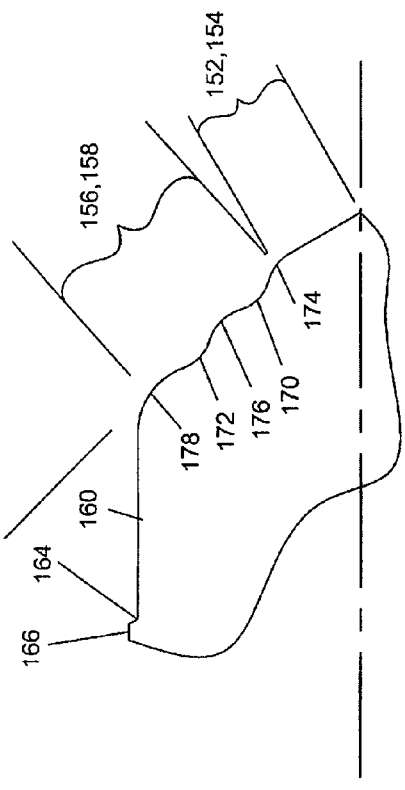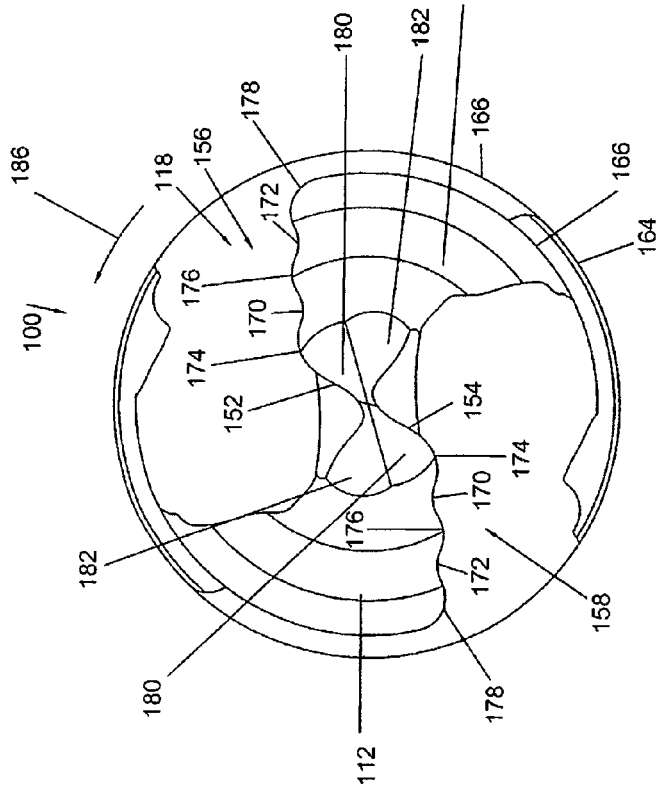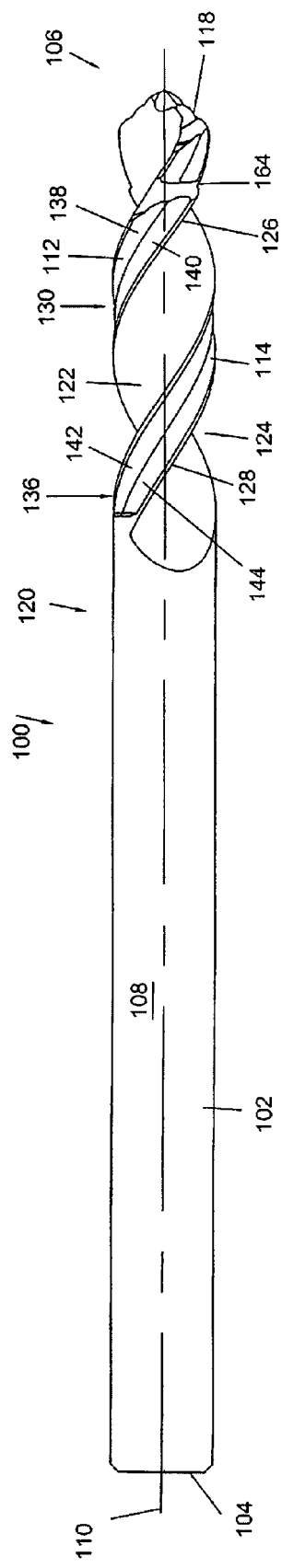
FIG. 6
FIG. 5
FIG. 4

DRILLING TOOL

CROSS-REFERENCE TO RELATED APPLICATIONS

This application claims priority to U.S. Provisional Patent Application Ser. No. 61/489,069 filed on May 23, 2011 titled "Drill Having Wave Form Cut Point" and the disclosure of which is expressly incorporated herein.

BACKGROUND OF THE INVENTION

1. Field of the Invention

The present invention generally relates to cutting and boring tools and, more specifically, an improved cutting tip shape for improving tool life and/or cutting performance.

2. Discussion of the Related Art

Virtually every industry requires the periodic piercing of various materials to form openings for any number of reasons including ventilation or fluid circulation, for acceptance or cooperation with other structures, and/or for passage of other structures such as fasteners. Understandably, these are only but of few of the reasons commonly encountered and associated with perforating a particular material or structure. It is further appreciated that, as being applicable across a plethora of industries, such motivations are applicable to various types and shapes of the respective material.

A plethora of drill bits are known for various applications and for use with virtually any material. Those skilled in the art will readily appreciate that every drill has a useable life wherein the drill will adequately cut the underlying material, will negligibly deform the material during the drilling operation, and maintain a suitable operating temperature during the drilling process. Those skilled in the art equally appreciate that a worn or consumed boring or drilling tool will require excessive downward force for subsequent drilling operation, requires increased torsional loading to effectuate the drilling operation, can create unacceptable mushrooming or blowout of the substrate material near the hole site, and/or can generate unacceptable temperatures that can detrimental effect both the tool, the material of the substrate, and the quality of the perforation.

After an initial use period, some users attempt to extend the usable lift of a worn tool by restoring the shape of the cutting tip to a sharpened edge. Periodically, some worn tools can be re-sharpened in such a manner but it is readily appreciated that such processing of the tooling achieves only a very limited usability of the tooling beyond the original projected usable life of the tool, can detrimentally affect the original equipment manufacturer (OEM) finishing of the cutting tool, and can generate undesirable heat in the tool and particularly the cutting edge during the sharpening operation. Commonly, such post manufacture processes can only remotely approximate the quality of the initial OEM cutting tip shape and configuration. Periodically, such attempts can even detract from the performance of the tooling due in part to the reconfiguration and/or heat treatment of the cutting tip. Additionally, such processes are susceptible to individualization of the tooling as a function of the skill of the respective user or technician attempting the sharpening process and can detrimentally affect the repeatability associated with hole formation during subsequent use of the respective tooling. Accordingly, such processes provide only limited, if any, extension of the usable life of the respective tool.

It is further appreciated that the profitability and efficiency of any industry that relies heavily upon drilling operations can be substantially affected by drilling tools that degrade and/or are too quickly consumed during normal use. Tooling that is consumed too quickly during normal use results in increased operator time associated with tooling changes, increases manufacturing costs due to the increased consumption of tooling, can increase the wear associated with operation of the tool driving devices, decreases part throughput and process times, and negatively contributes to the overall efficiency of part production and manufacture.

It would therefore, rather than providing yet another post manufacture cutting tool sharpening tool or system, be desirable to provide a boring tool such as a drill bit that is configured to better withstand the forces associated with drilling operations and to do so in a manner that does not substantially increase the cost associated with production of such tooling. It would also be desirable to provide a drill bit with an improved operating life and which does not materially affect the quality of the substrate proximate a hole site.

BRIEF DESCRIPTION OF THE INVENTION

The present invention provides a boring tool that overcomes one or more of the drawbacks discussed above. A first aspect of the invention discloses a drill bit or boring tool having cutting edge that includes a pair of generally smooth curvilinear shaped portions that are positioned near the radial outer portions of the cutting edge and connected to one another by a pair of generally linear portions that traverse the longitudinal centerline of the tool. A drill bit or boring tool having a cutting edge or cutting tip having such a shape has been shown to provide improved usable tool life while also reducing the undesirable effects of tear out, mushrooming, and heating of the work material throughout the useable life of the boring tool.

Another aspect of the invention discloses a drill bit having a shaft that extends along a longitudinal axis. The shaft includes a shank that is engageable with a drive tool at one end of the shaft and a cutting tip at an opposite end of the shaft. The cutting tip further comprises at least two cutting edges that each extend in an outward radial direction between the longitudinal axis of the shaft and an outer circumference of the shaft. Each cutting edge is tapered toward the shank as the cutting edge extends in an outward radial direction from the longitudinal axis. Each cutting edge includes at least one deviation from a linear shape. The at least one deviation has a curvilinear shape that extends between the linear portion of the respective cutting edge and an outer radial edge of the shaft.

Another aspect of the invention discloses a method of forming a boring tool. An elongate body is provided that extends along a longitudinal axis. The elongate body includes a first end that is configured to cooperate with a drive tool and a cutting point that is formed at a second end of the body opposite the first end. A first linear portion and a second linear portion are formed along a distal edge of the cutting point. The first linear portion and the second linear portion are formed on opposite sides of the longitudinal axis of the elongate body. A first curvilinear contour and a second curvilinear contour are formed in the distal edge of the cutting point. Each curvilinear contour is offset in a radial direction from the longitudinal axis of the elongated body and located radially outboard of the respective adjacent linear portion such that the only non-tangential discontinuity of the cutting point occurs at a transition between the first linear portion and the second linear portion at the intersection of the longitudinal axis.

A further aspect of the invention discloses a drill bit having an elongated body that extends between a tool end and a work end. A cutting tip is formed at the work end of the drill bit. A first linear portion and a second linear portion are each formed on the cutting tip and intersect one another proximate a centerline of the elongated body. Each linear portion extends laterally across the cutting tip and is pitched toward the tool end of the elongate body as each respective linear portion extends in an outward radial direction from the centerline. A groove portion is formed on each opposite lateral side of the cutting tip. Each groove portion is located radially outboard of an adjacent one of the first linear portion and the second linear portion and extends laterally across the elongated body. Each groove portion is also pitched toward the shank end of the elongate body and terminates short of a circumferential radius of the elongated body. Each groove portion and corresponding respective linear portion form a continuous tangential shape that extends the entire length of the cutting tip on each opposite side of the centerline.

These and various other aspects, features, and advantages of the present invention will be made apparent from the following detailed description and the drawings.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 1 is a side elevation view of a drill bit accordingly to one embodiment of the present invention;

FIG. 2 is top plan view of the drill bit shown in FIG. 1;

FIG. 3 is a detailed elevation view of a portion of a work tip of the drill bit shown in FIG. 1;

FIG. 4 is a view similar to FIG. 1 of a drill bit according to another embodiment of the invention;

FIG. 5 is a top plan view of the drill bit shown in FIG. 4; and

FIG. 6 is a detailed elevation view of a portion of a work tip of the drill bit shown in FIG. 1.

In describing the preferred embodiments of the invention which are illustrated in the drawings, specific terminology is resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto can often be used. They are not limited to direct connection but include connection through other elements where such connection is recognized as being equivalent by those skilled in the art.

DETAILED DESCRIPTION OF THE PREFERRED EMBODIMENT

FIGS. 1-3 show a boring tool, a drilling tool, drill bit or simply a bit 10 having a pair of cutting edges 12, when considered with respect to a radial direction and relative to the longitudinal center axis of bit 10, according to a first embodiment of the present invention. As shown in FIG. 1, bit 10 includes an elongate body 14 generally defined as a shaft 16 that extends between a shank or tool end 18 and a tip, cutting tip, work tip, or work end 20. Tool end 18 is generally understood as that portion of bit 10 constructed to be chucked or otherwise engaged with a driving tool, such as a chuck, a drill, a mandrel, or other rotatable driving element to effectuate rotation of bit 10 during boring or drilling processes.

Bit 10 includes one or more optional grooves or flutes 28 that extend along a portion 24 of a longitudinal length, indicated by line 26, from work end 20 towards tool end 18. Flutes 28 are generally defined as one or more grooves that are separated by one or more lands 22 that also extend along body 14 of bit 10 in a direction away from cutting edge 12. Those skilled in the art will readily appreciate that flutes 28 and lands 22 are shaped and oriented to vent debris or swarf generated during a drilling or boring process from the hole being formed thereby. Although flutes 28 and lands 22 are shown as extending in a helical manner about portion 24 of body 14, it is appreciated that flutes 28 and lands 22 could extend at other helical pitch angles than that which is shown, be formed to extend in a generally linear or longitudinal manner along body 14, or be omitted in other drilling or boring tools. It is further appreciated that the number of flutes 28 and lands 22, the longitudinal component of the helical pattern, the thickness of flutes 28 and lands 22, and the depth of flutes 28 could be provided in a variety of parameters and are preferably selected to satisfy, at least in part, one or more parameters associated with the intended use of bit 10.

Body 14 of bit 10 extends in a longitudinal direction along a longitudinal axis or centerline, indicated line 30, of body 14. Flutes 28 and lands 22 are wound about centerline 30 and extend in a longitudinal direction, also indicated by line 26, along body 14. Body 14 has a diameter, indicated by line 34, which can but need not be associated with the size of a bore or hole intended to be formed by use of the respective bit 10. A resultant hole or bore is commonly defined by a diameter 34A associated with work end 20 associated with cutting edge 12. Body 14 includes a radius proximate tool end 18, indicated by dimension line 36, which is defined as the distance between an outer circumferential edge 32 of body 14 and centerline 30 of the tool shank and a radius 36A associated with work end 20. It is appreciated that body 14 can be provided in a variety of diameters 34A to form different sized holes associated therewith and that the shank portion of body 14 need not be configured to pass through such a hole.

During the drilling or boring operation, bit 10 commonly rotates about centerline 30 and is displaced in a longitudinal direction, indicated by arrow 40, to effectuate the formation of a bore or hole in a substrate or work material 42. It is appreciated that substrate or work material 42 can have virtually any thickness and composition. In a preferred aspect of the present invention, drilling tools equipped with cutting edge 12 have been shown to provide marked improvement of bore quality and tool life when used with at least synthetic materials such as carbon or other fiber reinforced materials. It is appreciated that the same attributes could be appreciated by users of virtually any material commonly worked with such boring tooling. That is, cutting edge 12 has been shown to provide dramatically increased tool life with respect to variety of comparably sized tools having cutting edges of different shapes.

FIG. 2 shows a plan view of cutting edge 12 of bit 10 and FIG. 3 shows a partial view of only one radial side of cutting edge 12. Cutting edge 12 includes a pair of alternate radial cutting portions 48, 50 that each defines a respective cutting edge 12 relative to the longitudinal centerline of bit 10. The radial cutting portions 48, 50 are generally separated from one another by the axis associated with centerline 30. Alternate radial portions 48, 50 extend in opposite lateral or radially outward or outboard directions, indicated by arrows 52, 54 (FIG. 3) from centerline 30. Each radial cutting portion 48, 50 includes a linear portion 56, 57 and a groove portion or curvilinear contour or curvilinear portion 58, 59 that smoothly transition into one another, respectively, and, when considered collectively, extend the respective cutting portion 48, 50 from centerline 30 to circumferential edge 32. Linear portions 56, 57 extend between a distal tip 60 of bit 10 and a transition zone 68, 69 associated with the intersection of the respective linear portion 56, 57 and corresponding curvilinear portion 58, 59.

As explained further below with respect to FIGS. 2 and 3, cutting edge 12 includes a first linear portion 56 and first curvilinear portion 58 and a second linear portion 57 and a second curvilinear portion 59 that define that shape of each respective cutting edge 12. As explained further below, each respective cutting edge includes a deviation or a change in direction from the line associated with the cutting edge of the respective linear portion 56, 57. Each of the first respective linear and curvilinear shaped portion pair 56, 58 and the second linear and curvilinear shape portion pair 57, 59 extend from the centerline 30 of bit 10 toward the circumferential edge 32 of the bit. It is appreciated that a bit having a different number of flutes 28 and lands 22 could have a different number of linear and curvilinear shape pairs.

Referring to FIG. 3, the alternate radial linear portions 56, 57, or the portions of cutting edge 12 that are both linear and extend in a radial, outward, or outboard direction relative to centerline 30, are separated from each other by an angle 62. Angle 62 is less than 180 degrees, is greater than 60 degrees, and can preferably be about 120 degrees but other angles of separation can be provided for providing a more or less aggressive angle of attack of cutting edge 12 as a function of the composition and/or hardness of material 42, intended operating speed of bit 10, material of bit 10, and/or treatment of cutting edge 12. Such a construction also infers that each linear portion 56 is approximately 60 degrees, indicated by angle 61, from centerline 30. It is further appreciated that each linear portion 56 has the same orientation relative to centerline 30 to provide uniform rotational operation of bit 10. However, it is appreciated that for bits having other numbers of linear portions, such bits can be provided with linear portions that are formed at different angles relative to one another and/or different angles relative to centerline 30.

Still referring to FIGS. 2 and 3, each curvilinear portion 58, 59 extends from a first end 64, 65 that generally smoothly transitions from the respective linear portion 56, 57 to a second end 66, 67 that likewise smoothly transitions to a longitudinal radial outer edge 70 of body 14 of bit 10. Cutting edge 12 can include an optional radius 81 that forms a curvilinear intersection between the corresponding curvilinear portion 58, 59 and edge 70 of body 14. Preferably, curvilinear portion terminates radially inboard of radius 88 and extends in a repeating manner between radius 88 transition zone 68, 69. Minimally, at least one deviation from the linear orientation of the respective linear shaped cutting edge is formed between the linear portion of the cutting edge and the outward radial or circumferential edge of bit 10. As shown in FIG. 3, two deviations, or the shapes associated with a number of valleys 76, 78, 80, 82 are provided between the outer radial end of each respective linear portion of the cutting edge and the outer radial shape of bit 10. Understandably, as explained further below, more or fewer deviations may be provided in each respective radial portion of cutting edge 12.

As shown in FIGS. 2 and 3, each alternate radial curvilinear portion 58, 59 of cutting edge 12 includes a number of valleys 76, 78, 80, 82 that extend in a downward longitudinal direction towards tool end 18 of bit 10. Each curvilinear portion 58, 59 of cutting edge 12 also includes a number of curved ridges 84, 86, 88 that smoothly transition between the adjacent linear portion 56, 57, respective valleys 76, 78, 80, 82 and longitudinal radial edge 70 or optional radius 81 of body 14 of bit 10. Such a construction provides a cutting edge 12 that forms a nonlinear cutting face wherein the only non-tangential directional change of the cutting surface is formed at distal tip 60 associated with work end 20 at the interface between the linear portions 56, 57 on the opposite sides of centerline 30. Said in another way, adjacent locations along cutting edge 12 are tangential to one another other than at the transition across centerline 30 at the interface of the opposite linear portions 56, 57. Said in another way, each cutting tip 12 has a continuous tangential shape that extends the entire length or diameter of the cutting tip on each opposite side of centerline 30. As is also shown in FIG. 3, each deviation associated with a respective curvilinear portion of the cutting edge that is nearer the longitudinal axis 30 of bit 10 extends in a direction that is more aligned with the longitudinal axis 30 than a second deviation or portion of the respective curvilinear shape that is nearer the outer circumferential edge 32 of bit 10 than the first portion and extends in a direction that more so approaches being perpendicular to longitudinal axis 30 than the radially interior oriented deviation.

Momentarily referring back to FIGS. 1 and 2, alternate grooves or flutes 28 and lands 22 extend along a portion of the longitudinal length of bit 10. As disclosed above, bits having other numbers of flutes and grooves are envisioned and within the scope of the appending claims. Alternate radial cutting-edge portions 90, 92 extend along the helical longitudinal edge of each respective flute and land 22. It is appreciated that cutting-edge portions 90, 92 be shaped and oriented relative to the diameter of cutting edge 12 to provide only limited cutting or "dressing" of a respective hole or provided only a guided interaction of bit 10 with the sidewalls of the resultant hole formed by cutting edge 12 of bit 10. As explained further below with respect to FIGS. 4-6, it is envisioned that edge portions 90, 92 may provide such a final dress cut to the resultant hole.

Referring back to FIGS. 2 and 3, as curvilinear portions 58, 59 of cutting edge 12 traverse in a generally rearward rotational direction, or direction in opposite to the rotational direction indicated by arrow 96, away from the cutting edge 12 of bit 10, the contour associated with the linear portions 56, 57, valleys 76, 78, 80, 82, and curved portions 84, 86, 88 regress or decline toward tool end 18 of bit 10. Such a construction reduces the undesired interaction between those portions of bit 10 that are offset from cutting edge 12 toward tool end 18 of bit 10 while maintaining enough structure of bit 10 proximate the cutting edge 12 so as to effectuate the cutting process without undue downward force. Preferably, the contour of valleys 76, 78, 80, 82, and curved portions 84, 86, 88 are tapered in the longitudinal direction toward tool end 18 and rotationally oriented relative to a plane oriented perpendicular to the longitudinal centerline 30 of bit 10.

Preferably, the channels associated with valleys 76, 78, 80, 82 are ground into curvilinear portions 58, 59 of cutting edge 12 thereby deviating curvilinear portions 58, 59 from a substantially linear shape. Preferably, each land 22 includes a generally planar face that faces a corresponding flute 28. Such a configuration provides a smooth transition from valleys 76, 78, 80, 82 into the space that extends along the longitudinal length of lands 22. Preferably, each valleys 76, 78, 80, 82 has a length that is substantially nearer the widest width of the respective valleys 76, 78, 80, 82 than to a longitudinal length of bit 10. Said in another way, although each valley 76, 78, 80, 82 extends along cutting edge 12 in a direction generally along the longitudinal shape of the respective land 22, such length is only a very small portion of the overall length of the longitudinal length of the respective flute and corresponding 22.

FIGS. 4-6 show a bit 100 according to another embodiment of the invention that also shows unexpected improvements with respect to its usable life as well as a bore or hole quality. Like bit 10, bit 100 includes an elongate body 102 that extends between a tool end 104 and a work end 106. Body 102 is defined by a shaft 108 that extends along a longitudinal axis or centerline 110 of bit 100. A number of lands 112, 114 extend in a helical manner about a portion of bit 100. Lands 112, 114 extend from a cutting edge 118 of bit 100 toward a shank portion 120 of bit 100 and are separated by respective grooves or flutes 122, 124. A rotationally forward facing edge of each land 112, 114 is defined by a cutting face 126, 128 that extends along the forward helical edge of the respective land 112, 114. The radially outward oriented face 130, 132 of each land 112, 114 includes a number of optional grooves 138, 140, 142, 144 that are oriented rearward of the respective cutting edge 126, 128. Grooves 138 140, 142, 144 reduce drag associated with the rotational movement of the outer radial surface of lands 112, 114 past the material associated with the bore or hole formation.

As shown in FIGS. 5 and 6, like bit 10, cutting edge 118 of bit 100 includes a first linear portion 152 and a second linear portion 154 that extend in opposite generally radial directions relative to centerline 110 of bit 100. Cutting edge 118 includes first and second curvilinear portions 156, 158 that extend in outward radial directions from each linear portion 152, 154 toward a first circumferential edge 160 of bit 100. As alluded to above and as explained further below, bit 100 includes a step 164 that provides a final transition between first circumferential edge 160 and a second or largest circumferential edge 166 of bit 100. Circumferential edge 166 is defined by the outer radial edge associated with lands 112, 114 and the cutting-edge 126, 128 associated therewith. Edges 160, 166 and step 164 allows that portion of bit 100 that is radially inboard of step 164 to remove a majority of the material associated with a hole formed with bit 100 and such that cutting edges 126, 128 and the radially forward facing portion of step 164 provide a hole dressing and/or final cut associated with formation of a respective hole.

As shown in FIG. 6, each curvilinear portion 156, 158 includes one or more valleys 170, 172 and one or more ridges 174, 176, 178 that provide for a nonlinear but generally smooth transition between first circumferential edge 160 and the outer radial edge of the respective linear portion 152, 154 of bit 100. Like bit 10, linear portion 152 includes a relief that extends rearward from the cutting edge associated with the linear portion thereof. Each linear portion 152, 154 of bit 100 includes a first relief 180 and a second relief 182 that are tapered in a downward direction toward tool end 104 of bit 100. Reliefs 180, 182 serve to reduce the amount of material of bit 100 that is rearward of the linear portion 152, 154 of cutting edge 118 that contacts the substrate material during a drilling operation due to the rotation of bit 100 in an operating direction, indicated by arrow 186. Similarly, as grooves or valleys 170, 172 and ridges 174, 176, 178 regress in a rearward rotational direction, a rotational direction opposite direction 186, valleys 170, 172 and ridges 174, 176, 178 translate in a downward longitudinal direction toward tool end 104 of bit 100, respectively, to limit that portion of the end surface of the respective lands 112, 114 that is rearward of the respective curvilinear portion 156, 158 of cutting edge 118 which contacts the work material during the drilling operation.

The substantially non-linear shape of the cutting edge associated with bits 10, 100 increases the cutting length associated with operation of the respective cutting tip to over 10% more than the cutting length of a material being worked or the entry pitch diameter of the hole being formed. Accordingly the elongated length of the cutting edge provided by bits 10, 100 is believed to at least partly improve the operating life of the corresponding bit 10. It is perceived that the generally smooth continuous waveform of the curvilinear shape of the cutting edge introduces some benefits to the cutting process that cannot be achieved with conventional drilling tools. The continuously changing shape associated with cutting edges 12, 118 appears to result in a continuously changing shear angle of the point of interface or cut with the material with respect to the radial direction associated with the cut. This change is believed to result in changing forces along the cut interface and such interaction seemingly improves cutting action, may tend to reduce harmonics and/or tool chatter, reduce localized temperature concentrations during drilling processes, and may even contribute to providing a smoother and/or quieter cut.

Although some prior art drill bits are provided with singular or multiple straight line cutting edges that may be provided at different angles relative to one another, the shape of cutting edges 12, 118 displays highly unexpected results with respect to tool life and hole quality allowing use of bit 10, 100 beyond the usable life of comparably sized and treated tools not equipped with cutting edge 12, 118, respectively. Simply put, bits 10, 100 have an operating life that is unexpectedly much longer than other comparable sized tools. As explained further below, it is believed that the operating life of bits 10, 100 can be even more improved with the use of optional coating materials applied to at least cutting edge 12, 118 and optionally along the longitudinal helical edges of the one or more flutes and lands associated therewith.

Although it is envisioned providing at least cutting edge 12, 118 of a bit with a supplemental wear resistant treatment, such as one of a honing operation, a shot peening process, a heat treating process, a quenching process, and/or applying a coating of a diamond based or diamond coating or diamond like material or coating (DLC), or a physical vapor deposition (PVD) coating, and preferably, applying at least one such treatment to both cutting edge 12, 118 and the longitudinal length of the outer radial edge of at least a portion of respective flutes and lands, the unexpected useful life benefits described above have been observed in bits without such supplemental treatment thereby evidencing the beneficial performance of merely the shape of cutting edge 12, 118. Those skilled in the art will readily appreciate from applicant's disclosure that such treatment processes will further improve the operating life of the resultant bit.

Cutting tips 12, 18 include a geometrically definable shape of the drill point or cutting tip at the distal end of a twist drill. Approximately the center radial third of cutting tip is a generally straight angled section. It is appreciated that the angled section could be provided at virtually any cutting angle that maintains a penetration vector although the straight angled section is preferably provided between approximately 105 degrees to 160 degrees from the longitudinal axis of the drill bit. It is also appreciated that the linear portion of the cutting edge can extend for different percentages such as greater than ⅛ of the total cut diameter, less than ⅞ of total cut diameter, or any percentage therebetween. As shown, the center radial third of cutting edge 12 is maintained at about 60-180 degrees, or alternatively 90-150 degrees relative to the longitudinal length of the opposite radial side linear portion of the cutting tip or relative to the longitudinal axis of respective drill bit 10, 100. Said in another way, the alternate radial portions of cutting edge 12, 118 can be separated by 40-180 degrees relative to one and are more preferably separated by an angle or alternatively about 80-120 degrees relative to one another.

Radially outward of the radially outward oriented ends of the center radial third of cutting edge 12, 118 and preferably in a substantially tangential manner with respect to the longitudinal axis of the respective bit, cutting edge 12, 118 transitions into a series of pseudo sine-wave contours that transition to the radial or at least near circumferential largest outer edge of the respective bit. Preferably, each geometric transition or directional change is smooth and provides no stepped discontinuity to the form of the cutting edge 12, 118 except at the transition between the alternate radial sides of the cutting edge 12, 118 and which occurs at centerline 30, 110 of the respective bit 10, 100. Preferably, cutting edge 12, 118, and the geometry thereof, is imparted on the drill point by grinding the form on the end associated with cutting edge 12, 118 of the bit but it is appreciated that other means of forming cutting edge 12, 118 are envisioned and, with consideration of this disclosure, within the skill of those in the art.

Each of cutting edges 12, 118 has been shown to dramatically increase the effective or operating life of bit 10, 100. That is, cutting edge 12, 118 has been shown to substantially increase the number and quality of holes a drill bit can produce prior to failure, independent of the drill and work-piece material. That is, it is appreciated that cutting edge 12, 118 can improve the hole quality and number of holes that can be drilled through various materials including but not limited to metal based materials such as aluminum, brass, carbon, and stainless steels and alloys, cast materials, laminate and glass and/or fiber reinforced materials such as boron or carbon fiber reinforced materials. It is appreciated that such materials, as well as the drilling of holes in such materials, has applicability across a number of industries including construction, automotive, and aircraft fabrication and maintenance fields. It is believed that bits 10, 100 provide a desired hole finish and bit life that exceeds the capabilities of any currently available and comparable sized product. It is further appreciated that bits 10, 100 can be formed from any number of materials but is preferably formed of a carbide tool material.

Although bits 10, 100 are shown in the figures as having a specific shape and configuration as indicated by the various dimensions discussed in reference to the figures, it is appreciated that bits 10, 100 could be provided in form factors of various drill bit diameters to provide different hole sizes, any number of waves provided on cutting edge 12, 118 wave shapes having different wave frequencies and amplitudes, (which will affect the inherent wave radii), varied sizes associated with the outside corner radius at the joining of the cutting tip with the outer diameter of the drill bit, center portions with various angles and operating lengths, alternate relative positions of the wave of the cutting tip relative to the centerline of drill bit, alternate numbers and depths of flute and land pairs along the longitudinal length of the drill bit, etc. In a preferred aspect, the cutting tip of bits 10, 100 has a generally smooth curvilinear shape wherein the only non-tangential directional change to the edge associated with the cutting process occurs at the centerline of the respective bit and between the linear inner radial portions of the respective cutting edge.

In a preferred aspect, the relative depths between the alternate contours of the curvilinear portion of the respective cutting tip is preferably between 1-4% of the total diameter of the respective bit and is preferably about 2.4% of the bit diameter. An outer circumferential radius, such as the radius associated with outer radial ridges 81, 178, when provided, is preferably between 10-20% of the total bit diameter and preferably about or equal to 15% of the bit diameter. Preferably, the radius associated with each valley and ridge, such as valleys and ridges 76, 78, 80, 82 84, 86, 170,172, 174, 176 is between about 5-15% of the bit diameter and is preferably about or equal to 9.5% of the overall diameter. With respect to the ranges specified above and the use of the term about with respect to the same, it is appreciated that the term "about" is the same as "approximately" and includes all of the discrete percentage values within each respective range. It is further appreciated that although each of cutting edges 12, 118 are shown as having only two recesses or valleys along the radially oriented but longitudinal length of the respective cutting edge, other numbers of positive and/or negative contours could be provided as the longitudinal length of the cutting edge as a function of the diameter of the resultant bit and the corresponding length of the respective linear sections of the respective cutting edges.

Therefore, one embodiment of the invention includes a drill bit or boring tool having a cutting edge that includes a pair of generally smooth curvilinear shaped portions that are positioned near the radial outer portions of the cutting edge and connected to one another by a pair of generally linear portions that traverse the longitudinal centerline of the tool. A drill bit or boring tool having a cutting edge or cutting tip having such a shape has been shown to provide improved usable tool life while also reducing the undesirable effects of tear out, mushrooming, and heating of the work material throughout the useable life of the boring tool.

Another embodiment of the invention includes a drill bit having a shaft that extends along a longitudinal axis. The shaft includes a shank that is engageable with a drive tool at one end of the shaft and a cutting tip at an opposite end of the shaft. The cutting tip further comprises at least two cutting edges that each extend in an outward radial direction between the longitudinal axis of the shaft and an outer circumference of the shaft. Each cutting edge is tapered toward the shank as the cutting edge extends in an outward radial direction from the longitudinal axis. Each cutting edge includes at least one deviation from a linear shape. The at least one deviation has a curvilinear shape that extends between the linear portion of the respective cutting edge and an outer radial edge of the shaft.

Another embodiment of the invention includes a method of forming a boring tool. An elongate body is provided that extends along a longitudinal axis. The elongate body includes a first end that is configured to cooperate with a drive tool and a cutting point that is formed at a second end of the body opposite the first end. A first linear portion and a second linear portion are formed along a distal edge of the cutting point. The first linear portion and the second linear portion are formed on opposite sides of the longitudinal axis of the elongate body. A first curvilinear contour and a second curvilinear contour are formed in the distal edge of the cutting point. Each curvilinear contour is offset in a radial direction from the longitudinal axis of the elongated body and located radially outboard of the respective adjacent linear portion such that the only non-tangential discontinuity of the cutting point occurs at a transition between the first linear portion and the second linear portion at the intersection of the longitudinal axis.

Another embodiment of the invention includes a drill bit having an elongated body that extends between a tool end and a work end. A cutting tip is formed at the work end of the drill bit. A first linear portion and a second linear portion are each formed on the cutting tip and intersect one another proximate a centerline of the elongated body. Each linear portion extends laterally across the cutting tip and is pitched toward the tool end of the elongate body as each respective linear portion extends in an outward radial direction from the centerline. A groove portion is formed on each opposite lateral side of the cutting tip. Each groove portion is located radially outboard of an adjacent one of the first linear portion and the second linear portion and extends laterally across the elongated body. Each groove portion is also pitched toward the shank end of the elongate body and terminates short of a circumferential radius of the elongated body. Each groove portion and corresponding respective linear portion form a continuous tangential shape that extends the entire length of the cutting tip on each opposite side of the centerline.

The present invention has been described in terms of the preferred embodiment. The several embodiments disclosed herein are related as being related to the assembly as generally shown in the drawings. It is recognized that equivalents, alternatives, and modifications, aside from those expressly stated, the embodiments summarized, or the embodiment shown in the drawings, are possible and within the scope of the appending claims. The appending claims cover all such alternatives and equivalents.

What is claimed is:

1. A drill bit comprising:
   an elongate body having a tool end and a work end with a cutting tip formed thereat;
   a first linear portion and a second linear portion that are each formed on the cutting tip and intersect one another proximate a centerline of the elongate body, each linear portion extending laterally across the cutting tip and pitched toward the tool end of the elongate body at a first rate as each respective linear portion extends in an outward radial direction from the centerline;
   a groove portion formed in the work end of the elongate body on each opposite lateral side of the cutting tip that is radially outboard of an adjacent one of the first linear portion and the second linear portion, each groove portion including at least one groove that extends laterally across the work end of the elongate body such that a depth of the at least one groove in a direction aligned with the centerline of the elongate body reduces as the at least one groove extends across the work end in a rotational direction away from and beyond a leading edge of the cutting tip of the elongate body, and being pitched in a radial direction toward the tool end of the elongate body at a second rate that is greater than the first rate and terminating short of a circumferential radius of the elongate body, each groove portion forming a continuous tangential shape associated with the leading edge that extends an entire length of the cutting tip on each opposite side of the centerline such that each radially extending portion associated with the work end has a similar shape.

2. The drill bit of claim 1 further comprising at least two lands that extend along the elongate body from the cutting tip toward the tool end in at least one of a helical pattern and in a straight manner such that the work end is defined by a surface formed by a terminal end of the at least two lands between the leading edge and a trailing edge of each respective land.

3. The drill bit of claim 2 further comprising at least one groove that extends from the cutting tip toward the tool end on radially outward directed surfaces of at least one of the lands.

4. The drill bit of claim 1 further comprising a diamond coating deposited along at least the linear portion and the groove portion of the cutting tip.

5. The drill bit of claim 4 wherein the diamond coating is deposited along a forward facing edge of any lands formed along the elongate body.

6. The drill bit of claim 1 further comprising a step formed at a radially outboard surface of the elongate body wherein the step is offset toward the tool end relative to the cutting tip of the elongate body.

7. A drill bit comprising:
   a shaft that extends along a longitudinal axis and is defined by a shank end that is configured to engage a tool and a cutting tip at an opposite longitudinal end of the shaft;
   at least two flutes that extend along at least a portion of the longitudinal axis of the shaft and that separate at least two lands that extend along the portion of the longitudinal axis of the shaft, each land defined by a leading face and a trailing face that extend in a direction generally aligned with the longitudinal axis and an end face which extends in a crossing direction relative to the longitudinal axis and that defines a portion of the cutting tip, each end face having a shape that is the same as each other end face of the drill bit;
   a cutting edge that is defined by a center portion associated with a radial intersection of the at least two lands and radially outer portions that are defined by an intersection of the leading face and the end face of each land; and
   at least one groove formed in each end face of each land and which extends in a rearward rotational direction from the cutting edge toward the trailing face of the respective land and defined by a depth in a direction aligned with the longitudinal axis that gradually reduces in the rearward rotational direction as the at least one groove extends in the rearward rotational direction such that the groove extends from the leading face of the respective land and terminates prior to the trading face of the respective land such that an intersection of the leading face and the end face of each land has a generally curvilinear shape as it extends in an outward radial direction and an intersection of the end face and the trailing face of each land is unaltered by the at least one groove.

8. The drill bit of claim 7 further comprising at least two grooves formed in each end face of each land.

9. The drill bit of claim 8 wherein the at least two grooves have a radially inner located groove and a radially outer located groove.

10. The drill bit of claim 7 further comprising a coating applied to at least the cutting edge of the cutting tip.

11. The drill bit of claim 10 wherein the coating is further defined as at least one of a diamond coating, a diamond like coating (DLC), and a PVD coating.

12. The drill bit of claim 7 wherein the center portion of the cutting edge has a linear shape and extends for approximately one third of a total longitudinal length of each cutting edge and is oriented nearest the longitudinal axis of the shaft.

* * * * *